(12) United States Patent
Boyd et al.

(10) Patent No.: US 8,261,896 B2
(45) Date of Patent: Sep. 11, 2012

(54) TUNED MASS DAMPERS AND VIBRATION ISOLATION APPARATUS

(75) Inventors: James H. Boyd, Glendale, AZ (US);
Dale T. Ruebsamen, Glendale, AZ (US);
Joseph E. Vecera, Glendale, AZ (US);
Toren S. Davis, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 1028 days.

(21) Appl. No.: 12/233,218

(22) Filed: Sep. 18, 2008

(65) Prior Publication Data
US 2010/0065390 A1    Mar. 18, 2010

(51) Int. Cl.
*F16F 7/10* (2006.01)
(52) U.S. Cl. .......... 188/379; 188/378; 188/380
(58) Field of Classification Search .......... 188/378, 188/379, 380; 267/136, 140.13, 141.1, 141.2; 248/550, 566; 124/89
See application file for complete search history.

(56) References Cited

U.S. PATENT DOCUMENTS

| | | | |
|---|---|---|---|
| 2,586,043 A | 2/1952 | Hodgson et al. | |
| 2,797,931 A * | 7/1957 | Hans | 280/758 |
| 4,050,665 A * | 9/1977 | Matthews et al. | 248/638 |
| 4,893,606 A | 1/1990 | Sisko | |
| 4,960,290 A | 10/1990 | Bose | |
| 4,982,719 A | 1/1991 | Haggard et al. | |
| 5,265,387 A | 11/1993 | Ishimaru et al. | |
| 5,370,104 A * | 12/1994 | Neie | 124/89 |
| 5,390,656 A | 2/1995 | Villa et al. | |
| 5,460,156 A | 10/1995 | Sappington | |
| 5,595,169 A * | 1/1997 | Brown, Jr. | 124/89 |
| 5,615,664 A | 4/1997 | McDonald, Jr. | |
| 5,775,472 A * | 7/1998 | Osterberg et al. | 188/378 |
| 5,816,373 A * | 10/1998 | Osterberg et al. | 188/380 |
| 6,292,967 B1 | 9/2001 | Tabatabai et al. | |
| 6,315,094 B1 | 11/2001 | Griffin et al. | |
| 6,394,242 B1 | 5/2002 | Allaei | |
| 6,454,063 B1 * | 9/2002 | Osterberg et al. | 188/379 |
| 6,508,343 B2 | 1/2003 | Misaji et al. | |
| 6,634,472 B1 * | 10/2003 | Davis et al. | 188/378 |
| 6,681,908 B2 * | 1/2004 | Davis | 188/380 |
| 6,935,206 B2 | 8/2005 | Allaei | |
| 7,032,723 B2 | 4/2006 | Quaglia et al. | |
| 7,051,617 B2 * | 5/2006 | Smith et al. | 74/573.13 |
| 7,182,188 B2 * | 2/2007 | Ruebsamen et al. | 188/298 |
| 8,002,094 B2 * | 8/2011 | Ruebsamen et al. | 188/379 |

* cited by examiner

*Primary Examiner* — Robert A Siconolfi
*Assistant Examiner* — Mariano Sy
(74) *Attorney, Agent, or Firm* — Ingrassia Fisher & Lorenz, P.C.

(57) ABSTRACT

A tuned mass damper is provided for use with a structure that vibrates at a first axial surge mode and a second axial surge mode, when exposed to a predetermined frequency range. The tuned mass damper includes a housing, an endcap, two masses, and two springs. The first and second masses are disposed in a housing cavity. The first tuned mass damper spring is disposed in the cavity coupling the first mass and the endcap. The second tuned mass damper spring is disposed in the cavity coupling the first and second masses. The tuned mass damper has first and second resonant frequencies in the predetermined frequency range to damp the first and second axial surge modes, respectively. The second mass resonates at an amplitude that is greater than an amplitude at which the first mass resonates, when the two masses are subjected to the second axial surge mode.

17 Claims, 4 Drawing Sheets

TUNED MASS DAMPERS AND VIBRATION ISOLATION APPARATUS

TECHNICAL FIELD

The inventive subject matter generally relates to vibration isolation apparatus and tuned mass dampers for use on vibration isolation apparatus.

BACKGROUND

A precision pointing system carrying a sensor, such as a telescope, as its payload, may be susceptible to disturbances that produce structural vibrations and, consequently, pointing errors. Such vibrations may be attributed to mechanical components or assemblies, such as reaction wheel assemblies that are used as actuators in the precision pointing system. For the most part, because these systems tend not to have significant, inherent damping, these structural vibrations may degrade system performance and even cause structural fatigue over time.

To minimize the vibrations, an isolation strut is typically used to damp the structure and isolate the payload. One type of isolation strut operates as a three-parameter vibration isolation system and includes a hollow shaft, a piston, and a main spring. The piston receives vibration from the payload and is configured to slidably move through the shaft in response to the vibration. A flange extends radially from a midsection of the piston and has a top surface that is coupled to a first sealed bellows and a bottom surface that is coupled to a second sealed bellows. Each of the bellows has a chamber that is filled with fluid. Thus, when the piston moves axially through the shaft, fluid flows from one of the bellows chambers to the other. The shaft and piston are disposed within the main spring, which provides axial stiffness to the isolation strut in general.

During system operation, the isolation strut may be subjected to a frequency that causes the main spring to resonate. In some cases, the degree of resonance is such that it interferes with the capability of the strut to damp vibrations. In other cases, the resonance may degrade the structural integrity of the spring, and the spring may become prematurely worn. To attenuate the degree of resonance, one or more elastomer pads may be contacted with or attached to the main spring. However, this configuration has drawbacks. For example, the elastomer pads may unpredictably creep when exposed to certain temperatures, and thus, may not attenuate the resonance as desired. Additionally, the elastomer pads, which are typically made of insulating material, may block electrical and/or thermal conduction thereby creating electromagnetic interference and overheating issues.

Accordingly, it is desirable to have a vibration isolation apparatus that has improved damping capabilities. In addition, it is desirable to have a vibration isolation apparatus that does not resonate significantly when subjected to predetermined frequency ranges. Furthermore, other desirable features and characteristics of the present inventive subject matter will become apparent from the subsequent detailed description of the inventive subject matter and the appended claims, taken in conjunction with the accompanying drawings and this background of the inventive subject matter.

BRIEF SUMMARY

Tuned mass dampers and vibration isolation apparatus are provided.

In an embodiment, a tuned mass damper is provided for use with a structure that vibrates at a first axial surge mode and a second axial surge mode, when exposed to a predetermined frequency range. The tuned mass damper includes a housing, an endcap, a first mass, a second mass, a first tuned mass damper spring, and a second tuned mass damper spring. The housing defines a cavity and includes an end. The endcap is disposed over the end of the housing. The first mass is disposed in the cavity, and the second mass is disposed in the cavity. The first tuned mass damper spring is disposed in the cavity coupling the first mass and the endcap. The second tuned mass damper spring is disposed in the cavity coupling the first mass and the second mass. The tuned mass damper has a first resonant frequency that is in the predetermined frequency range to damp the first axial surge mode, the tuned mass damper has a second resonant frequency that is in the predetermined frequency range to damp the second axial surge mode, and the second mass resonates at an amplitude that is greater than the amplitude at which the first mass resonates, when the first mass and the second mass are subjected to the second axial surge mode.

In an embodiment, by way of example only, a vibration isolation apparatus includes a main spring and a tuned mass damper. The main spring is capable of vibrating at a first axial surge mode when exposed to a first frequency and a second axial surge mode when exposed to a second frequency and has a length measured from a first end to a second end. The tuned mass damper is coupled to the main spring and includes a housing, an endcap, a first mass, a second mass, a first tuned mass damper spring, and a second tuned mass damper spring. The housing defines a cavity and includes an end. The endcap covers the end of the housing. The first mass is disposed in the cavity, and the second mass is disposed in the cavity. The first tuned mass damper spring is disposed in the cavity coupling the first mass and the endcap, and the second tuned mass damper spring is disposed in the cavity coupling the first mass and the second mass. The tuned mass damper has a first resonant frequency within the predetermined frequency range to damp the first axial surge mode, the tuned mass damper has a second resonant frequency within the predetermined frequency range to damp the second axial surge mode, and the tuned mass damper is disposed at an axial location on the main spring that is located between a first axial position at about 37.5% of the length of the main spring and a second axial position at about 62.5% of the length of the main spring.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description of the inventive subject matter is merely exemplary in nature and is not intended to limit the inventive subject matter or the application and uses of the inventive subject matter. While the isolation struts are discussed with reference to exemplary embodiments, any one of numerous other embodiments of a vibration isolation apparatus having a main spring may be implemented as well. For example, it will be appreciated that the inventive subject matter may be implemented in any vibration isolation apparatus that includes a main spring. Furthermore, there is no intention to be bound by any theory presented in the preceding background or the following detailed description.

Figure 1:
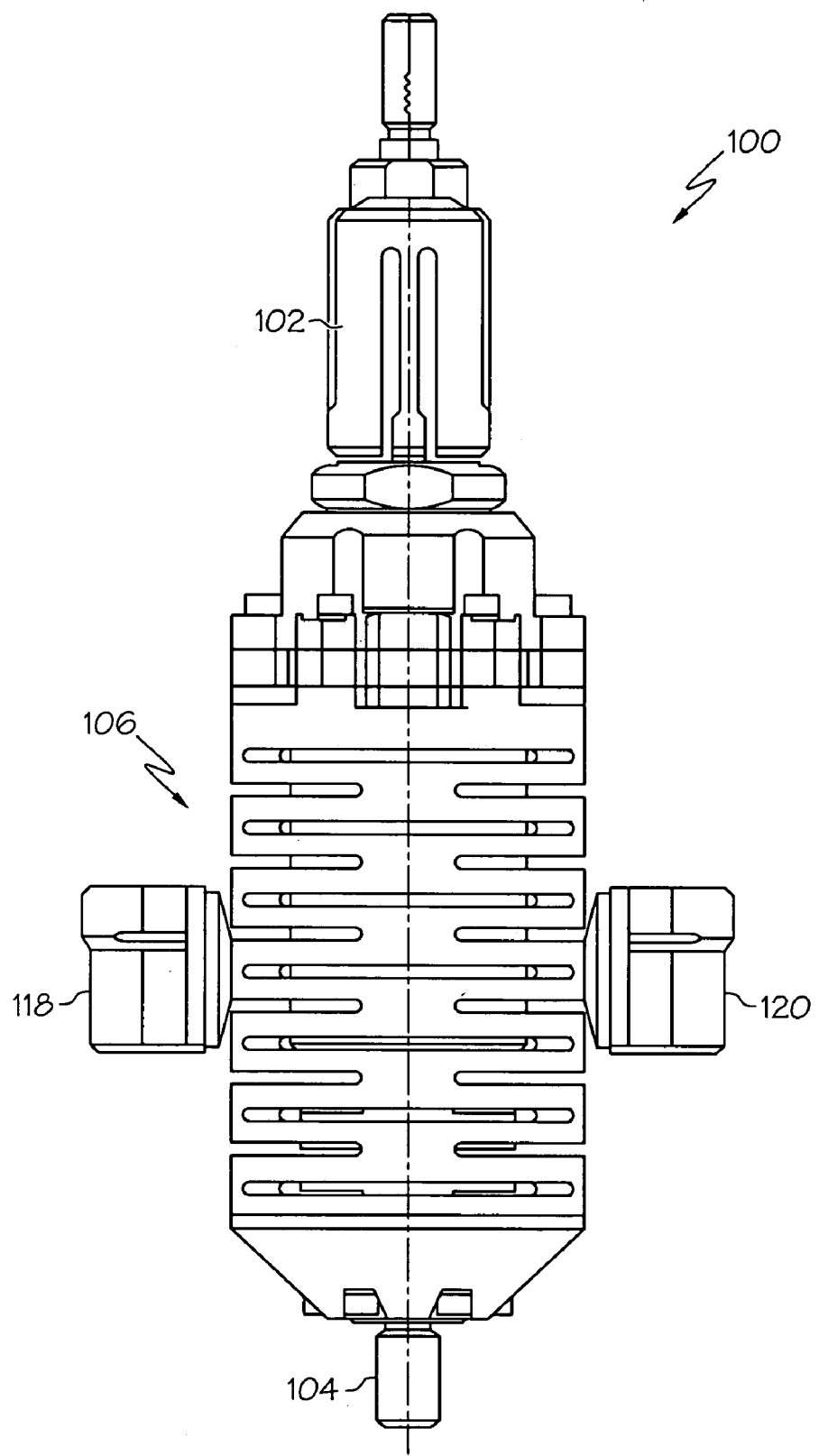
FIG. 1 is a side view of a vibration isolation apparatus, in accordance with an embodiment.
Figure 2:
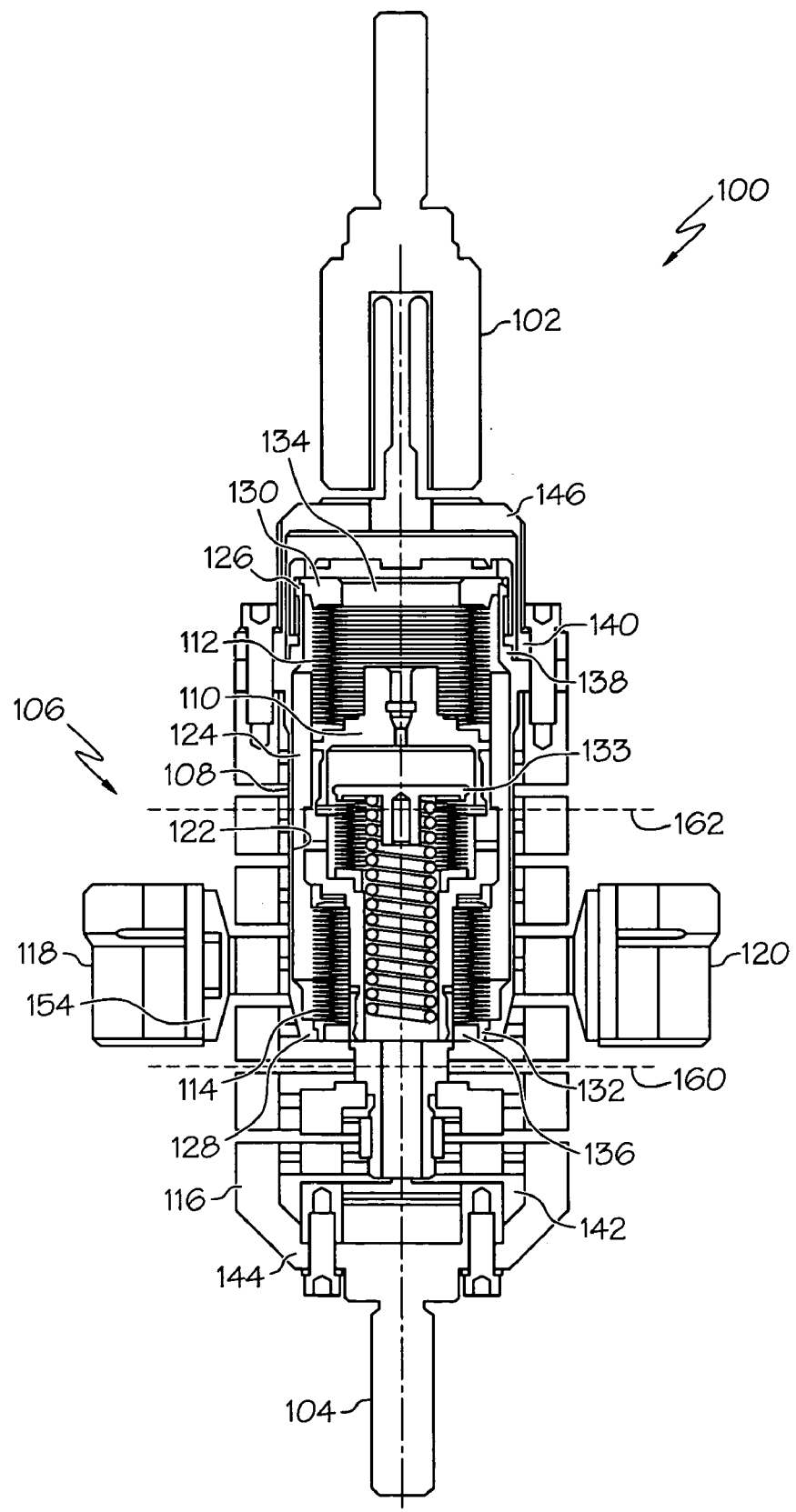
FIG. 2 is a cross-sectional view of the vibration isolation apparatus shown in FIG. 1, in accordance with an embodiment.

FIGS. 1 and 2 show a side view and a cross-sectional view of a vibration isolation apparatus 100, in accordance with an embodiment. In one embodiment, the vibration isolation apparatus 100 may include a pivot 102, a support 104, and a vibration isolation apparatus 106 extending therebetween. The pivot 102 is adapted to receive vibratory motion from a non-illustrated payload, which may be a telescope, a reaction wheel assembly or any other device or apparatus that may vibrate and that may be damped. The support 104 attaches the vibration isolation apparatus 106 to a non-illustrated base. In an embodiment, the support 104 may be integrally formed as part of the vibration isolation apparatus 106. In another embodiment, the support 104 may be separately formed and coupled to the vibration isolation apparatus 106. Although the support 104 is illustrated in FIG. 1 as being disposed on an opposite end of the vibration isolation apparatus 106 from the pivot 102, it will be appreciated that the support 104 alternatively may be formed on or coupled to any other suitable part of the vibration isolation apparatus 106.

As shown in more detail in FIG. 2, the vibration isolation apparatus 106 includes a main spring 116, a shaft 108, a piston 110, first and second bellows 112, 114, and at least one tuned mass dampers 118, 120, in an embodiment. The main spring 116 is generally cylindrical and houses at least a portion of the shaft 108, piston 110, and bellows 112, 114 therein. In an embodiment, the main spring 116 includes a first opening 138 at one end 140, and a second opening 142 at an opposite end 144. The end 140 on which the first opening 138 is formed is coupled to the pivot 102 via an attachment cap 146, while the end 144 on which the second opening 142 is formed is used to attach the main spring 116 to the support 104. In an embodiment, the attachment cap 146 and the support 104 enclose the shaft 108, piston 110, and bellows 112, 114 within the main spring 116.

As alluded to above, the shaft 108 is adapted to cooperate with the piston 110 and the bellows 112, 114 to damp a portion of the motion. In accordance with an embodiment, the shaft 108 is generally cylindrical and has an inner surface 122 and ends 126, 128. The inner surface 122 defines a passage 124 within which the piston 110 and bellows 112, 114 are disposed. A first end 126 of the shaft 108 may be at least partially covered with a first endcap 130, and a second end 128 of the shaft 108 may be at least partially covered by a second endcap 132. In an embodiment, the endcaps 130, 132 each include openings 134, 136.

To maintain the piston 110 in position relative to the shaft 108, the piston 110 is attached to the first endcap 130 via the first bellows 112 and to the second endcap 132 via the second bellows 114. Fluid (not shown), such as a viscous liquid or a gas, fills the passage 124 to provide damping when the piston 110 receives vibration from the pivot 102. The vibration isolation apparatus 106 may also include a temperature compensator 133 to compensate for thermal expansion that may be experienced by the fluid. In an embodiment, the temperature compensator 133 may include a bellows that attaches the piston 110 to the support 104.

During operation, the main spring 116 may resonate with multiple axial surge modes when vibrated within a predetermined frequency range. An axial surge mode is a frequency which causes the main spring 116 to vibrate axially. The predetermined frequency range may be a range that includes one or more resonant frequencies of the main spring 116. The main spring 116 may resonate with a first axial surge mode when vibrated at a first frequency within the predetermined frequency range, a second axial surge mode when vibrated at a second frequency within the predetermined frequency range, and so on. In some cases, the resonance of the main spring 116 may interfere with damping capabilities of the vibration isolation apparatus 100.

To attenuate the multiple axial surge modes, one or more tuned mass dampers 118, 120 are mounted to the main spring 116, in an embodiment. The tuned mass dampers 118, 120 are each adapted to attenuate multiple axial surge modes, in an embodiment. In other embodiments, one or more of the tuned mass dampers 118, 120 may be further adapted to attenuate lateral surge modes. Although two tuned mass dampers 118, 120 are included in the depicted embodiment, a single tuned mass damper may be included in one embodiment. In another embodiment, more than two tuned mass dampers may alternatively be included. The number of tuned mass dampers included on the main spring 116 may depend on the particular frequencies of the axial surge modes and/or lateral surge modes to be damped, and/or the particular dimensions of the main spring 116.

Figure 3:
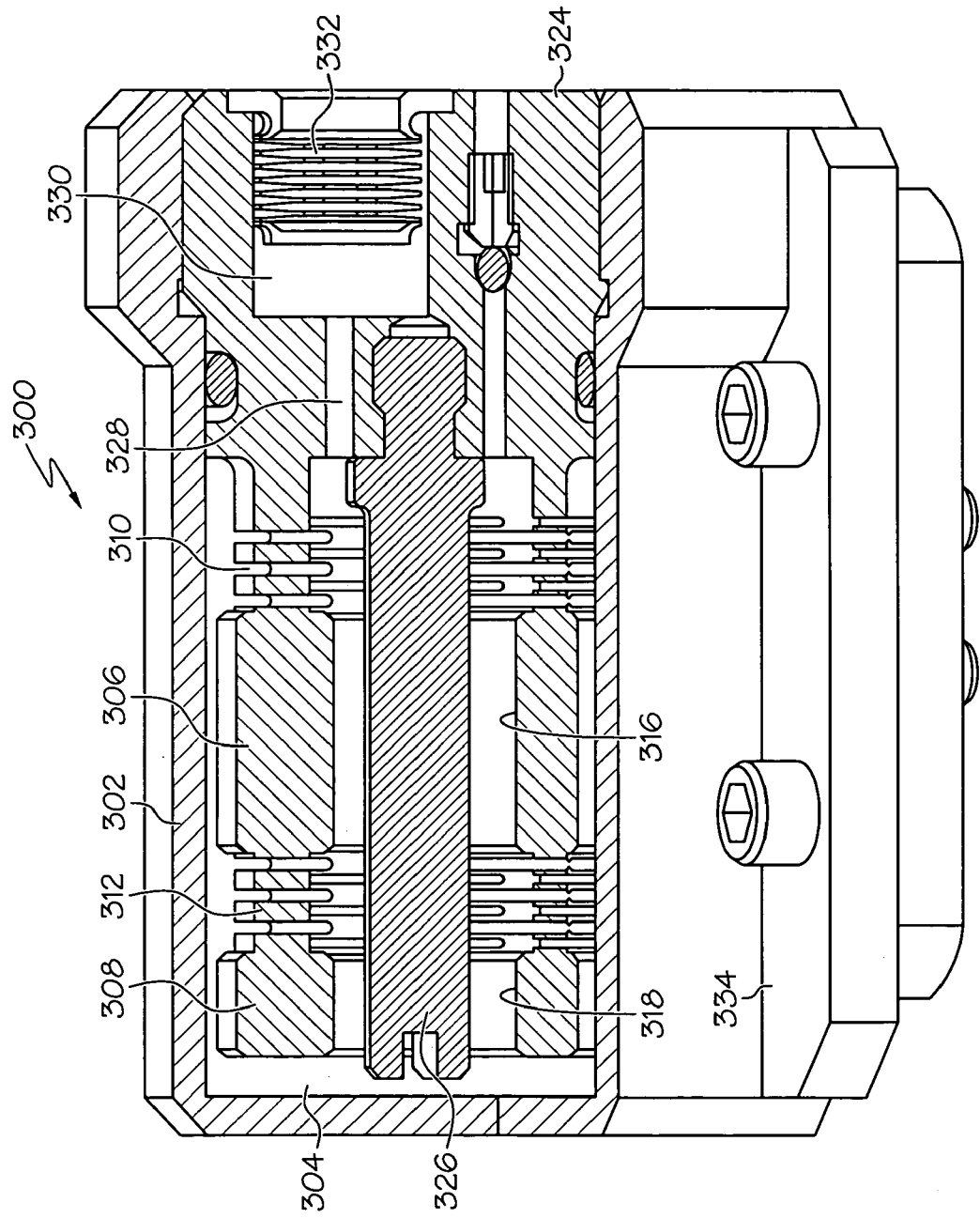
FIG. 3 is a cross-sectional view of a tuned mass damper that may be implemented as part of the vibration isolation apparatus shown in FIG. 1 or FIG. 2, in accordance with an embodiment.

FIG. 3 is a cross-sectional view of a tuned mass damper 300, in accordance with an embodiment. The tuned mass damper 300 includes a housing 302 that is generally cylindrical and that defines a cavity 304. According to an embodiment, a first mass 306, a second mass 308, a first tuned mass damper spring 310, a second tuned mass damper spring 312, and a fluid (not shown) are disposed in the cavity 304. The first and second masses 306, 308 are ring-shaped and have inner diameter surfaces 316, 318 that form openings. In an embodiment, the first tuned mass damper spring 310 couples the first mass 306 to an endcap 324, and the second tuned mass damper spring 312 couples the first mass 306 to the second mass 308. The endcap 324 is disposed over an end of the cylindrical housing 302 and seals the cavity 304. In accordance with an embodiment, a shaft 326 protrudes from the endcap 324 to extend through the openings of each mass 306, 308. In an embodiment, the endcap 324 may include an aperture 328 that is formed along its length to provide communication from the cavity 304 to a temperature compensation chamber 330 formed in the endcap 324. The fluid fills the cavity 304, the aperture 328, and the temperature compensation chamber 330, and surrounds the masses 306, 308 and the springs 310, 312. A temperature compensator bellows 332 may be disposed within the endcap 324 in communication with the temperature compensation chamber 330, and may be adjusted to compensate for thermal expansion of the fluid. Optionally, a flange 334 may extend outwardly from the cylindrical housing 302 for coupling the tuned mass damper 300 to a main spring (e.g., main spring 116 of FIG. 2).

The tuned mass damper 300 is configured to damp multiple axial surge modes. In this regard, the masses 306, 308 combined with springs 310, 312 may be configured to act as a single mass that resonates at a particular frequency to thereby damp a first axial surge mode of a structure (e.g., the main spring 116) that may be experienced by the structure at a frequency in a first frequency range. According to another embodiment, the masses 306, 308 combined with springs 310, 312 may be configured to act as a single mass that resonates at a particular frequency to thereby damp a second axial surge mode of a structure (e.g., the main spring 116) that may be experienced by the structure at a frequency in a second frequency range. In yet another embodiment, the second mass 308 (or the mass having an end coupled to a tuned mass damper spring 312 and unconstrained end) in combination with the spring coupled adjacent thereto (e.g., spring 312), may be configured such that it resonates with a particular frequency at an amplitude to damp the second axial surge mode of the structure, where the amplitude is more than the amplitude at which the first mass 306 resonates when the two masses 306, 308 are subjected to the frequency in the second frequency range. In another embodiment, the frequencies in the first and second frequency ranges at which the first and second masses 306, 308 may damp may be less than the frequencies in the first and second frequency ranges at which the structure may experience the first and the second axial surge modes, respectively. For example, the frequencies in the first and second frequency ranges at which the first and second masses 306, 308 may damp may be in a range of about 5% to about 10% lower than the frequencies in the first and second frequency ranges at which the structure may experience the first and the second axial surge modes, respectively.

Generally, to design the tuned mass damper 300 to resonate in the manner described above, desired frequencies to be damped by the tuned mass damper 300 are first selected. In an embodiment, two desired frequencies may be selected; however in other embodiments, more may be selected. According to an embodiment, the desired frequencies of the tuned mass damper 300 may coincide with the first two frequencies (e.g., axial surge modes) of the structure to be isolated (e.g., main spring 116) and may be obtained by appropriate selection of the weights of the first and second mass 306, 308 and the stiffness of the first and the second tuned mass damper springs 310, 312. In an embodiment, Equation 1 may be used as part of the sizing selection process.

$$f_{1,2} = \frac{1}{2^{3/2}\pi} \left\{ \frac{\frac{k_1}{M_1} + \frac{k_2}{M_1} + \frac{k_2}{M_2}}{\mu \left[ \left( \frac{k_1}{M_1} + \frac{k_2}{M_1} + \frac{k_2}{M_2} \right)^2 - \frac{4k_1 k_2}{M_1 M_2} \right]^{1/2}} \right\}^{1/2} \text{ in Hertz.} \quad \text{Equation 1}$$

(Reference Blevins)

where:
M1=first mass (e.g., first mass 306)
M2=second mass (e.g., second mass 308)
k1=stiffness of the spring connecting the first mass and ground (e.g., first tuned mass damper spring 310);
k2=stiffness of the spring connecting the first mass and the second mass (e.g., second tuned mass damper spring 312); and
M1, M2, k1 and k2 have consistent mass and stiffness units.
In other embodiments, more exact analyses which include viscous damping, may be employed.

In order to design a tuned mass damper having particular characteristics, several conditions may be established prior to calculating the values for M1, M2, k1, and k2. For example, a system (e.g., system 100) may have a desired total weight limitation. Thus, in an embodiment, the total mass of the two masses of a tuned mass damper (e.g., first mass 306 and second mass 308) may be set to about 5% of the mass of a structure having a vibration to be damped (e.g., main spring 116). In another example in which space limitations may exist within the tuned mass damper (e.g., tuned mass damper 300), the tuned mass damper may be desired to include a larger mass (e.g., first mass 306) and a smaller mass (e.g., second mass 308), where the larger mass may have a mass that is about 50% larger than the smaller mass. In still another example, the tuned mass damper may be designed to have a certain acceptable tolerance. For instance, the two mass damper springs may be selected such that the tuned mass damper reduces the magnitude of vibration at the first and second axial surge modes by about 5% to about 10%.

Although the first mass 306 is depicted as being larger than the second mass 308, other embodiments may include the first mass 306 as being smaller than the second mass 308. No matter the particular configuration, one mass (either first mass 306 or second mass 308) may be smaller or larger than the other mass to tune the tuned mass damper 300 to frequencies that damp the first and second axial surge modes. Moreover, although two masses 306, 308 are shown in the tuned mass damper 300, more masses may alternatively be included. In particular, in embodiments in which more than two axial surge modes are experienced by the structure having a vibration to be damped (e.g., main spring 116), more than two masses may be included and each mass may be selected to damp one or more of the axial surge modes. For example, in embodiments in which three axial surge modes are experienced by the structure having a vibration to be damped, three masses could be included in the tuned mass damper.

In any case, by connecting the endcap 324, the first tuned mass damper spring 310, the first mass 306, the second tuned mass damper spring 312, and the second mass 308 in series with each other and by including fluid in the tuned mass damper, a damped two degree-of-freedom oscillator is formed. Additionally, the first two resonant frequencies of the tuned mass damper can be tuned to match desired frequencies by adjusting various design parameters, such as mass, spring stiffness, and damping values.

In addition to damping axial surge modes, the tuned mass damper 300 may be configured to damp a lateral spring surge mode, in accordance with another embodiment. The lateral spring surge mode may be a frequency at which the tuned mass damper 300 (or a component, e.g. main spring 116) vibrates laterally and may result from operation of the tuned mass damper 300 itself. To provide a damping mechanism for a lateral spring surge mode, a gap between one or both of the inner diameter surfaces 316, 318 of the masses 306, 308 and an outer surface of the shaft 326 may be particularly sized. For example, to provide an increased stiffness, the gap between the inner diameter surfaces 316, 318 of one or both of the masses 306, 308 and the outer diameter surface of shaft 326 may be decreased. Likewise, to provide decreased stiffness, the gap between the inner diameter surfaces 316, 318 of one or both of the masses 306, 308 and the outer diameter surface of shaft 326 may be increased.

To further optimize the ability of the tuned mass damper 300 to damp particular axial surge modes of a structure having a vibration to be damped (e.g., main spring 116), the tuned mass damper 300 may be disposed at particular positions on the structure. For example, returning to FIG. 2, in an embodiment, the tuned mass dampers 118, 120 may be located at axial positions that are between two locations, where the first axial position 160 is located in a range of about 30% to 45% of the length of the main spring 116 when the length is measured from the end 144 to the end 130 with a first axial position 160 located at about 37.5% of the length of the main spring 116, being preferred, in an embodiment. The second axial position 162 is located in a range of about 55% to about 70% of the length of the main spring when the length is measured from the end 144 to the end 130, with the second axial position 162 located at about 62.5% of the length of the main spring 116, being preferred, in an embodiment. However, it will be appreciated that the particular axial positioning of the tuned mass dampers 118, 120 may depend on the particular axial surge modes to be damped, the particular dimensions and configuration of the main spring 116, the size and configuration of the payload and/or base, and/or other factors. In an embodiment, one or both of the tuned mass dampers 118, 120 are directly attached to the main spring 116. In another embodiment, a flange 154 may be mounted directly to the main spring 116, and the tuned mass dampers 118, 120 are attached to the flange 154, as shown in FIG. 2.

Figure 4:
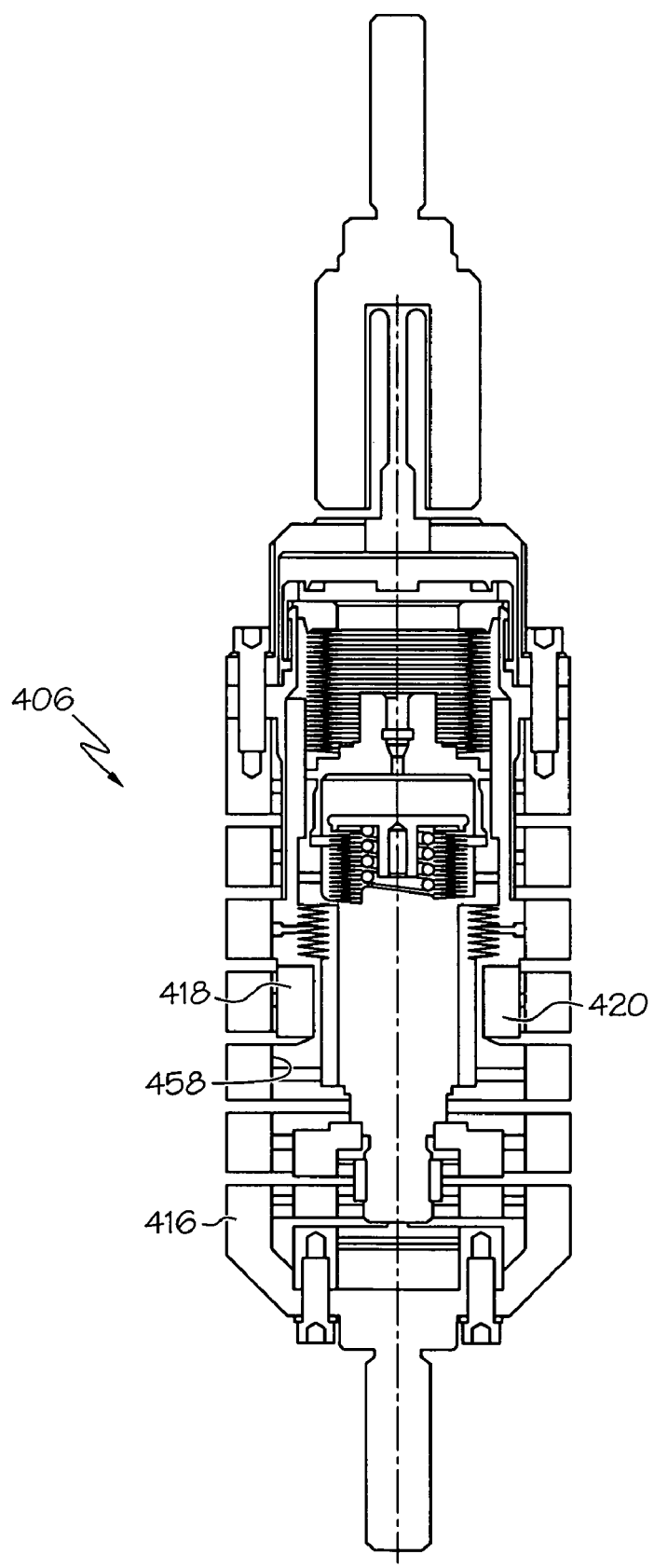
FIG. 4 is a cross-sectional view of a vibration isolation apparatus, in accordance with another embodiment.

Although shown attached to an outer surface of the main spring 116, the tuned mass dampers 118, 120 may alternatively be attached to an inner surface. FIG. 4 illustrates a cross-sectional view of a vibration isolation apparatus 406 including a main spring 416 having an inner surface 458. Tuned mass dampers 418, 420 are attached to the inner surface 458. To maintain damping capabilities in such an embodiment, the tuned mass dampers 418, 420 are disposed such that they do not contact any of the components that are contained within the main spring 416.

A vibration isolation apparatus has been provided that exhibits improved damping capabilities over conventional vibration isolation apparatus. In particular, tuned mass dampers are included on the improved vibration isolation apparatus that are each capable of damping multiple axial surge modes. In some embodiments, each tuned mass damper is further adapted to damp lateral surge modes. By allowing a single tuned mass damper to damp multiple surge modes, fewer components, and hence, less weight and space, may be occupied by the vibration isolation apparatus.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A tuned mass damper for use with a structure that vibrates at a first axial surge mode and a second axial surge mode, when exposed to a predetermined frequency range, the tuned mass damper comprising:
    a housing defining a cavity and including an end;
    an endcap disposed over the end of the housing, the endcap including a chamber and an aperture that provides fluid communication between the cavity and the chamber;
    a first ring-shaped mass disposed in the cavity;
    a second ring-shaped mass disposed in the cavity;
    a first tuned mass damper spring disposed in the cavity coupling the first mass and the endcap; and
    a second tuned mass damper spring disposed in the cavity coupling the first mass and the second mass;
    a shaft extending from the endcap and through the first mass, the first tuned mass damper spring, the second mass, and the second tuned mass damper spring,
    wherein:
        the tuned mass damper has a first resonant frequency that is in the predetermined frequency range to damp the first axial surge mode,
        the tuned mass damper has a second resonant frequency that is in the predetermined frequency range to damp the second axial surge mode, and
        the second mass resonates at an amplitude that is greater than an amplitude at which the first mass resonates, when the first mass and the second mass are subjected to the second axial surge mode.

2. The tuned mass damper of claim 1, wherein the shaft has an outer surface, the first mass has an inner diameter surface, and a gap between the outer surface of the shaft and the inner diameter surface of the first mass is configured to damp a lateral surge mode experienced by the structure.

3. The tuned mass damper of claim 1, wherein the chamber includes a temperature compensator bellows disposed therein.

4. The tuned mass damper of claim 1, wherein the first mass is larger than the second mass.

5. The tuned mass damper of claim 4, wherein the first mass is about 50% larger than the second mass.

6. The tuned mass damper of claim 1, wherein the structure vibrates at the first axial surge mode when exposed to a third frequency in the predetermined frequency range and the second axial surge mode when exposed to a fourth frequency in the predetermined frequency range, and the third frequency is in a range of about 5% to about 10% lower than the first axial surge mode, and the fourth frequency is in a range of about 5% to about 10% lower than the second axial surge mode.

7. A vibration isolation apparatus comprising:
    a main spring capable of vibrating at a first axial surge mode when exposed to a first frequency and a second axial surge mode when exposed to a second frequency, the main spring having a length measured from a first end to a second end; and
    a tuned mass damper coupled to the main spring, the tuned mass damper including:
        a housing defining a cavity and including an end;
        an endcap covering the end of the housing;
        a first mass disposed in the cavity;
        a second mass disposed in the cavity;
        a first tuned mass damper spring disposed in the cavity coupling the first mass and the endcap; and
        a second tuned mass damper spring disposed in the cavity coupling the first mass and the second mass,
    wherein:
        the tuned mass damper has a first resonant frequency within the predetermined frequency range to damp the first axial surge mode,
        the tuned mass damper has a second resonant frequency within the predetermined frequency range to damp the second axial surge mode, and
        the tuned mass damper is disposed at an axial location on the main spring that is located between a first axial position at about 37.5% of the length of the main spring and a second axial position at about 62.5% of the length of the main spring.

8. The vibration isolation apparatus of claim 7, further comprising:
    a shaft extending from the endcap, and
    wherein the first mass and the second mass are ring-shaped, and the shaft extends through the first mass, the first tuned mass damper spring, the second mass, and the second tuned mass damper spring.

9. The vibration isolation apparatus of claim 8, wherein the endcap includes a chamber, and the endcap includes an aperture that provides fluid communication between the cavity and the chamber.

10. The vibration isolation apparatus of claim 7, wherein the shaft has an outer surface, the first mass has an inner diameter surface, and a gap between the outer surface of the shaft and the inner diameter surface of the first mass is configured to damp a lateral surge mode experienced by the structure.

11. The vibration isolation apparatus of claim 7, wherein the endcap includes a chamber, and the chamber includes a temperature compensator bellows disposed therein.

12. The vibration isolation apparatus of claim 7, wherein the first mass is larger than the second mass.

13. The vibration isolation apparatus of claim 12, wherein the first mass is about 50% larger than the second mass.

14. The vibration isolation apparatus of claim 7, wherein the main spring has an outer surface and the tuned mass damper is coupled to the main spring outer surface.

15. The vibration isolation apparatus of claim 7, wherein the main spring has an inner surface and the tuned mass damper is coupled to the main spring inner surface.

16. The vibration isolation apparatus of claim 7, wherein the second mass resonates at an amplitude that is greater than an amplitude at which the first mass resonates, when the first mass and the second mass are subjected to the second axial surge mode.

17. A tuned mass damper for use with a structure that vibrates at a first axial surge mode and a second axial surge mode, when exposed to a predetermined frequency range, the tuned mass damper comprising:
   a housing defining a cavity and including an end;
   an endcap disposed over the end of the housing and including a chamber, the chamber having a temperature compensator bellows disposed therein
   a first mass disposed in the cavity;
   a second mass disposed in the cavity;
   a first tuned mass damper spring disposed in the cavity coupling the first mass and the endcap; and
   a second tuned mass damper spring disposed in the cavity coupling the first mass and the second mass,
   wherein:
      the tuned mass damper has a first resonant frequency that is in the predetermined frequency range to damp the first axial surge mode,
      the tuned mass damper has a second resonant frequency that is in the predetermined frequency range to damp the second axial surge mode, and the second mass resonates at an amplitude that is greater than an amplitude at which the first mass resonates, when the first mass and the second mass are subjected to the second axial surge mode.

* * * * *